US010721305B2

(12) United States Patent
Mullins

(10) Patent No.: US 10,721,305 B2
(45) Date of Patent: Jul. 21, 2020

(54) PRESENTING CONTENT USING DECOUPLED PRESENTATION RESOURCES

(71) Applicant: Microsoft Technology Licensing, LLC, Redmond, WA (US)

(72) Inventor: Christopher Lee Mullins, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 247 days.

(21) Appl. No.: 16/002,887

(22) Filed: Jun. 7, 2018

(65) Prior Publication Data

US 2018/0288157 A1   Oct. 4, 2018

Related U.S. Application Data

(63) Continuation of application No. 14/754,587, filed on Jun. 29, 2015, now Pat. No. 10,021,187.

(51) Int. Cl.
*H04L 29/08* (2006.01)
*G06F 40/117* (2020.01)
*G06F 40/151* (2020.01)
*G06F 40/197* (2020.01)
*H04L 29/06* (2006.01)

(52) U.S. Cl.
CPC ........ *H04L 67/1097* (2013.01); *G06F 40/117* (2020.01); *G06F 40/151* (2020.01); *G06F 40/197* (2020.01); *H04L 67/327* (2013.01); *H04L 69/166* (2013.01)

(58) Field of Classification Search
CPC . H04L 67/327; H04L 69/166; H04L 67/1097; G06F 17/2288; G06F 17/2264; G06F 17/218; G06T 11/40
See application file for complete search history.

(56) References Cited

U.S. PATENT DOCUMENTS

| | | | | |
|---|---|---|---|---|
| 8,639,214 B1* | 1/2014 | Fujisaki | ................. | G06Q 20/32 |
| | | | | 379/88.03 |
| 10,152,199 B2* | 12/2018 | Wilson | .................... | G06F 9/451 |
| 10,263,877 B1* | 4/2019 | Ie | .......................... | G06F 16/906 |
| 10,269,055 B2* | 4/2019 | Yamartino | ......... | G06Q 30/0625 |
| 10,395,373 B1* | 8/2019 | Brewster | .................. | G06K 9/00 |
| 10,484,503 B1* | 11/2019 | Bragdon | ........... | G06Q 30/0277 |
| 2011/0128288 A1* | 6/2011 | Petrou | ................ | G06K 9/00664 |
| | | | | 345/428 |
| 2011/0213655 A1* | 9/2011 | Henkin | .................. | G06Q 30/00 |
| | | | | 705/14.49 |
| 2015/0134688 A1* | 5/2015 | Jing | .................... | G06F 16/5866 |
| | | | | 707/766 |
| 2016/0048934 A1* | 2/2016 | Gross | ................. | G06Q 30/0276 |
| | | | | 705/313 |
| 2016/0092959 A1* | 3/2016 | Gross | ................. | G06K 9/00671 |
| | | | | 705/26.62 |
| 2018/0089158 A1* | 3/2018 | Mehta | .................... | G06F 3/0237 |
| 2018/0246983 A1* | 8/2018 | Rathod | ................. | G06F 3/0482 |

\* cited by examiner

*Primary Examiner* — Sargon N Nano
(74) *Attorney, Agent, or Firm* — Michael Best & Friedrich LLP

(57) ABSTRACT

A facility for presenting document contents is described. In an application, the facility receives a request to materialize particular document content. In response to receiving the request, further in the application, the facility causes the document content to be retrieved, and causes presentation code to present the retrieved document content; this presentation code is neither native to the application nor linked into the application to be executed.

20 Claims, 17 Drawing Sheets

Thank you for buying this Microsoft product! We value your business.

| fragment id | created by | creation time | access permissions |
|---|---|---|---|
| 894645 | visin | 9/6/2002 14:19:01 | r/w:all |
| 484324 | ahema | 1/16/1984 8:02:33 | r/w:all | fragment directory table — 800
— 801
— 802
811, 812, 813, 814

FIG. 8

| fragment version ID | fragment ID | update time |
|---|---|---|
| 65489151 | 894645 | 9/15/2002 9:17:12 |
| 12345498 | 894645 | 1/3/2001 10:32:19 |
| 91285817 | 484324 | 1/16/1987 16:02:54 | fragment version table — 900
— 901
— 902
— 903
911, 912, 913

FIG. 9 fragment version instance directory table — 1000

| fragment version ID | server ID | |
|---|---|---|
| 12345498 | 9103 | — 1001 |
| 12345498 | 1231 | — 1002 |
| 91285817 | 9103 | — 1003 |
| 91285817 | 2254 | — 1004 |
| 65489151 | 4545 | — 1005 |
| 65489151 | 9103 | — 1006 |
| 84321332 | 1231 | — 1007 |
| 84321332 | 4658 | — 1008 |

⎣—1011   ⎣—1012

FIG. 10 fragment version instance content table — 1100

| fragment version ID | update time | fragment contents | |
|---|---|---|---|
| 91285817 | 1/16/1987 16:02:54 | <image data> | — 1101 |
| 65489151 | 9/15/2002 9:17:12 | Microsoft Corporation ... | — 1102 |
| 12345498 | 1/3/2001 10:32:19 | Microsoft Corp. ... | — 1103 |

| content fragment type | presentation fragment ID | default presentation fragment | |
|---|---|---|---|
| text | 569349 | yes | ~1301 |
| text | 443870 | no | ~1302 |
| table | 321505 | yes | ~1303 |
| ⋮ | | | | content fragment type mapping table ~1300

PRESENTING CONTENT USING DECOUPLED PRESENTATION RESOURCES

RELATED APPLICATIONS

This application is a continuation application of U.S. application Ser. No. 14/754,587, filed Jun. 29, 2015, the entire content of which is herein incorporated by reference.

BACKGROUND

A variety of kinds of electronic documents exist, such as word processing documents containing mostly text; spreadsheets containing mostly numbers and formulae organized into a grid; slideshow documents organized into a sequence of slides having room for minimal content based on the typical need for them to be legible at a distance; business drawings in which text is associated with shapes connected in a particular configuration, etc. It is typical for a user to use a different monolithic application for performing actions of all kinds with respect to each type of electronic document. For example, word processing documents tend to be created, edited, and presented using a word processing application, while spreadsheet documents tend to be created, edited, and presented using a separate spreadsheet application.

SUMMARY

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

A facility for presenting document content is described. In an application, the facility receives a request to materialize particular document content. In response to receiving the request, further in the application, the facility causes the document content to be retrieved, and causes presentation code to present the retrieved document content; this presentation code is neither native to the application nor linked into the application to be executed.

BRIEF DESCRIPTION OF THE DRAWINGS

FIGS. 3-5 are display diagrams showing the editing and display of a document incorporating a shared document fragment.

FIG. 8 is a table diagram showing sample contents of a fragment directory table used by the facility in some embodiments to store information about fragments.

FIG. 9 is a table diagram showing sample contents of a fragment version table used by the facility in some embodiments to store information about fragment versions.

FIG. 10 is a table diagram showing sample contents of a fragment version instance table used by the facility in some embodiments to store information about fragment version instances.

FIG. 11 is a table diagram showing sample contents of a fragment version instance content table used by the facility in some embodiments to store fragment version instance content.

FIG. 13 is a table diagram showing sample contents of a content fragment type mapping table used by the facility in some embodiments to select a presentation fragment for a content fragment on the basis of the content fragment's type.

DETAILED DESCRIPTION

Overview

Figure 1:
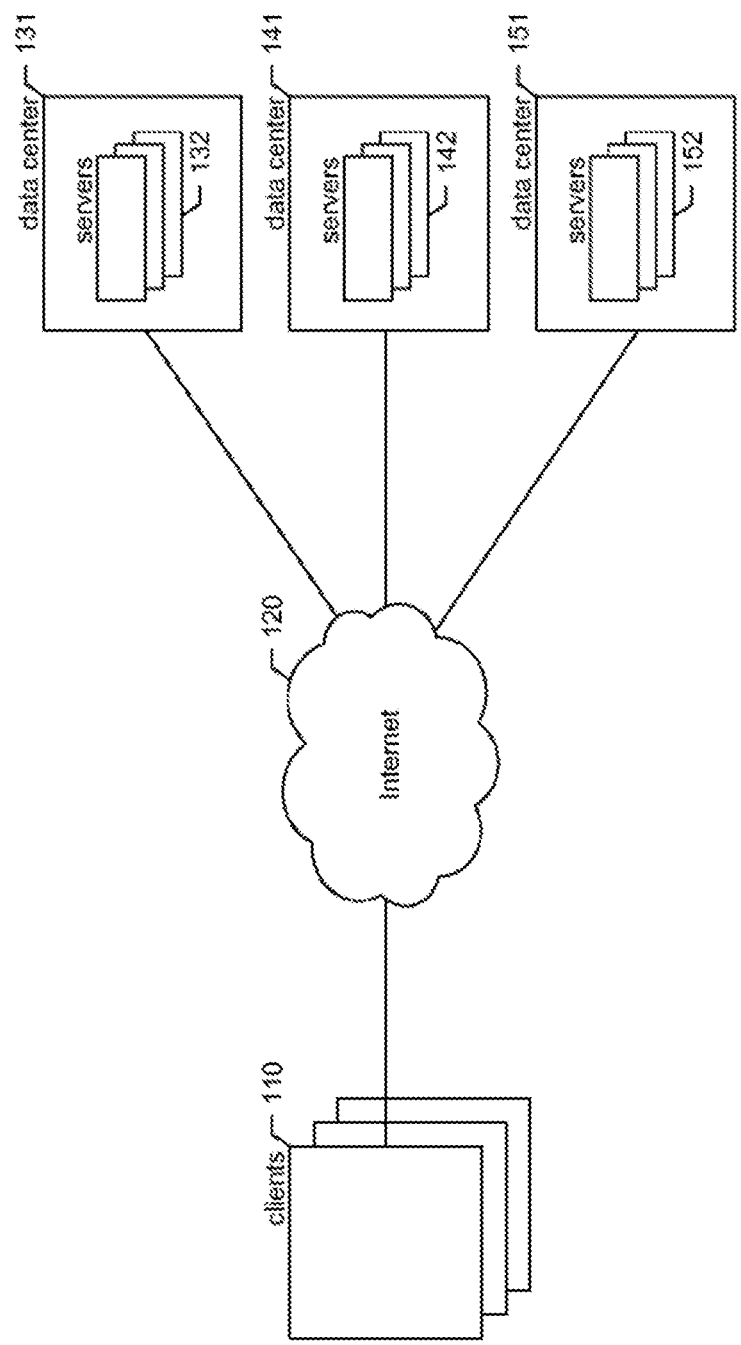
FIG. 1 is a network diagram showing the environment in which the facility operates in some embodiments.

The inventors have identified significant disadvantages with conventional approaches to presenting the contents of electronic documents. In particular, the code for displaying or otherwise presenting the contents of an electronic document of a particular type is generally included as part of the code of a monolithic application for creating and editing documents of that type. The inventors have determined that including presentation code as part of a monolithic application tends to impair development of the presentation code, as developers developing the presentation code must coordinate closely with developers developing the application's other code. This coordination imposes extra effort on both the developers developing the presentation code and the developers developing the application's other code, which can delay development.

Also, the inventors have recognized that conventional applications provide little or no control to document authors over how the content they author will be presented.

The inventors have further recognized that conventional applications undergo frequent releases; that many such releases change the file format used to store documents; and that application vendors' update processes typically involve replacing the second latest version of the application with the latest version, so that, at any given time, only the latest version of the application is installed. The inventors have recognized that this process often leaves users unable to display older documents. Where it is possible to display an older document, the document is frequently presented in a different way than it was originally by the version of the application that created it.

In order to overcome these disadvantages, the inventors have conceived and reduced to practice a software and/or hardware facility for presenting content using presentation resources that are decoupled from the code that authors execute in order to create and edit documents ("the facility"). Each of these presentation resources contains code for presenting content of a particular type. The code for a presentation resource may be developed in any of a variety of languages, and executed via interpretation, compilation, assembly, etc. The facility is extensible, in the sense that new presentation resources and presentation resource versions can be added over time to enable documents to be presented in new ways, while all the older documents continued to be presented as they have always been.

In some embodiments, an author of a document or a portion of a document can specify which presentation resource is to be used to present the document or portion thereof, whether the document or portion thereof is presented in isolation or in the context of another document in which it is incorporated. In some embodiments, an author who incorporates into a first document a second document or portion thereof can specify which presentation resource is to be used to present the second document or portion thereof in the context of the first document. In some embodiments, where, for particular content, a presentation resource is specified for neither the content nor its incorporation a document, the facility uses rules to select a presentation resource for the content, such as by selecting a default presentation resource designated for the content's type.

In some embodiments, presentation resources are versioned, such that successive versions of one presentation resource are created at different points in time, and/or by different developers. In some embodiments, where an author specifies a presentation resource, the author can specify a particular version of the presentation resource or a rule for selecting a particular version of the presentation resource. In some embodiments, where an author does not do so, the facility automatically selects a version of the presentation resource, such as the version of the presentation resource having the latest date, or the version of the presentation resource having the latest date among versions of the resource having certain approval statuses. In some embodiments, the facility automatically selects the version of the presentation resource that was the most recently created version at the time the document version was stored; this has advantages including that (a) this presentation resource version is certain to be able to handle presentation of the document version in whatever form it was stored; and (b) such presentation is consistent with presentation at the time this version of the document was created.

In some embodiments, the facility operates a marketplace for developers of presentation resources to make them available to authors and others. In some embodiments, the facility causes people obtaining presentation resources through the marketplace to be charged for the presentation resources; and various embodiments, the proceeds are paid to the developers of the presentation resources and/or to the operator of the facility.

In some embodiments, the facility stores both content and presentation resources using a construct called a "fragment," which is a unit of storage represented separately by the facility. A document is comprised of a single content fragment called a "root fragment," which can directly contain content, as well as containing fragment references referring to other content fragments. Those fragments referred to by the root fragment can themselves directly contain content and fragment references to other fragments, and so on. When a document is opened, the facility typically collects and synthesizes its contents by retrieving the root fragment, retrieving other fragments referred to by fragment references in the root fragment, retrieving further fragments referred to by fragment references in those fragments, and so on. In some embodiments, any fragment can be treated as a document, in the sense that it can be opened by an editing or presentation application as the root fragment.

In some embodiments, the facility also stores each presentation resource in a fragment. In some embodiments, the facility enables an author to specify a presentation fragment to be used to present a content fragment within the content fragment. For example, for a data table content fragment, an author may specify within the content fragment that the content fragment is to be presented using a particular presentation fragment that generates bar charts. In some embodiments, the facility enables an author to specify a presentation fragment to be used to present a content fragment in a fragment reference to the content fragment. For example, the author of a report fragment that incorporates a data table fragment may specify within the fragment reference that incorporates the data table content fragment that, when the data table content fragment is incorporated into the report fragment by this reference, the data table content fragment is to be presented by a particular presentation fragment that produces a line graph. Where the preceding two examples are combined, in some embodiments, the facility favors the presentation fragment specified in the fragment reference, despite the fact that a different presentation fragment was specified within the content fragment.

In some embodiments, the facility stores both fragments making up users' documents and presentation fragments in a cloud-based service, where they can be accessed from virtually any location. In some embodiments, this cloud-based service uses a technique called "erasure coding" in which it decomposes, or "shreds," a fragment defined by a document author into multiple smaller constituent pieces, or "shreds," each of which the facility stores on multiple storage devices in different data centers in different geographic locations to provide disaster and outage survivability. When the cloud-based service receives a request for a fragment, it retrieves and combines these shreds to reconstitute the fragment.

In some embodiments, the facility stores a new version of a fragment to reflect each editing action performed on the fragment, each identified by the date and time at which the editing action was performed. For example, in some embodiments, the facility creates a new fragment version for each character or group of characters that is inserted in the fragment—such as by a keystroke or a text block paste—and for each character or group of characters that is deleted—such as by a backspace keypress or a select-and-delete operation. In some embodiments, each fragment version identifies the author that took the editing action reflected by the fragment version. In some embodiments, after being written, these fragment versions cannot be altered, and are said to be "immutable."

In some embodiments, over time, the facility deletes some of the versions of a fragment, so as to collapse two or more editing actions into an undeleted version of the fragment. In some embodiments, in doing so, the facility deletes only contiguous fragment versions all reflecting editing actions by the same author and immediately preceding an undeleted fragment version also reflecting an editing action by the same author.

In some embodiments, where the content is incorporated from a fragment-aware source document, the facility ensures that the incorporated content corresponds precisely to one or more whole fragments; that is, where the selected content spans only a portion of a fragment in the source document, the facility breaks that fragment in the source document into two fragments, a first that contains only the content from the original fragment that was selected, a second containing the content from the original fragment that was not selected, so that the first can be incorporated into the target document while the second is not. Where the content is incorporated from a fragment-unaware source document, the facility creates a new fragment to contain the incorporated content.

In response to the incorporation operation, the facility creates a fragment reference in the target document at the position in the target document where the content was incorporated to represent the incorporated content in the target document. In some embodiments, the fragment reference contains multiple components, such as a current fragment ID component and/or an original component. The current fragment ID component of the created fragment reference identifies the fragment to which the reference refers, such as by containing a fragment ID for this fragment that can be used to retrieve this fragment. The origin component, where used by the facility, maintains in the fragment reference state the fragment ID of the fragment in which the incorporated content originated, which can serve as a basis for changing the mode in which the incorporated content is used in the target document throughout the life of the fragment reference, and for tracking the provenance of the fragment. In some embodiments, the facility stores an ordered list of fragment IDs in the origin component to reflect the series of fragments from which the referenced fragment has been forked.

In various embodiments, at the time the user performs the incorporation operation, the user can specify an initial mode for the incorporated content in the target document by, for example, holding down a certain keyboard key during the drag interaction, using a varying control key combination to paste the incorporated content into the target document, responding to a context menu or dialog displayed by the facility in response to the incorporation operation, etc. In some embodiments, each mode has two characteristics: (1) whether the contents of the fragment are editable in the context of the incorporating document or fragment ("editable in context") and (2) how a version of the referenced fragment is chosen for inclusion in the incorporating document or fragment ("version selection"). In some embodiments, the following kinds of version selection options are available: (a) "latest"—the version of the fragment with the most recent time is incorporated by the reference; (b) "time-specified"—a particular version of the fragment associated with a particular time is incorporated by the reference (e.g., in some embodiments, an arbitrarily specified time causes selection of the fragment version whose time is the latest among the fragments that are not later than the specified time); (c) "special"—special rules are used to specify which version of the fragment is selected for incorporation. Examples of special rules are the latest document approved by a qualified approval authority, or the earliest version embodying an edit by a particular author.

In various embodiments, the facility supports some or all of the following incorporation modes: live mode, follow mode, forkable mode, pinned mode, special forkable mode, and special follow mode.

Live mode (1) is editable in context and (2) uses "latest" version selection. Thus, in live mode, an author can change the content of the fragment, which results in a new version of the fragment being created to reflect each such change. These changes will appear in any other containing fragments that incorporate the same fragment, and whose version selection option ends up selecting this version, either (a) latest, or (b) special with a selection rule that selects this version. Live mode is typically used for a reference included to both revise the referenced fragment, and reflect the revisions of others. By virtue of using the latest version selection option, a reference in live mode incorporates the latest version of the fragment, no matter its content or which authors' revision it reflects. Where live mode is selected, the facility populates a current fragment ID component of the fragment reference with the same fragment ID as the origin component. The current component of the fragment reference identifies the fragment whose contents are to be retrieved for inclusion in the target document.

Follow mode (1) is not editable in context, and (2) uses latest version selection. In follow mode, the latest version of the fragment is always incorporated, but can't be edited in the context of the document or fragment containing the follow mode reference. Follow mode is typically used to incorporated dynamic content maintained by one or more other authors, in a centralized manner.

Forkable mode (1) is editable in context, and (2) uses time-specified version selection. In forkable mode, the fragment can be edited in the context of the reference from the fragment's state at the specified time. Performing such an edit transforms the reference from forkable mode to live mode; reflects the edit in the first version of a new fragment ID; stores the new fragment ID in the context of the reference; and stores the original fragment ID in the reference's origin component. Forkable mode is typically used where a particular state of a fragment is to be the basis for a new set of edits that won't affect documents or fragments incorporating the original fragment. Similarly, the forkable and resulting live reference aren't affected by edits to the original fragment subsequent to the forkable reference version selection time.

Pinned mode (1) is not editable in context, and (2) uses time-specified version selection. While the fragment reference is in pinned mode, the incorporated content cannot be changed, either by a user editing the document or fragment containing the pinned reference (because not editable in context precludes editing by such an author), or by a user editing the fragment in the context of a different containing document or fragment (because such edits will be reflected in a new version of the fragment, which will not be selected by the time-specified selection logic of this reference). Where pinned mode is selected, the facility populates the current component of the fragment reference with the fragment ID of the origin fragment. Pinned mode is typically used to preserve a particular state of the fragment in the referring document.

Special forkable mode (1) is editable in context, and (2) specifies a special version selection rule. The incorporated fragment will, at any given time, show the content of the version of the source fragment that is selected by the special version selection rule at the time. When an author edits the fragment in context, the forking process described above occurs. Special forkable mode can be used, for example, to use an evolving template whose edits are subject to periodic approval as a basis for creating instances of new content.

Special follow mode (1) is not editable in context, and (2) specifies a special version selection rule. Thus, a special follow reference shows the version of the fragment that satisfies the version selection rule at any given time, which is not editable in context. This mode can be used, for example, to pull into a document or fragment centrally-authored content that is periodically rereleased by its authors to reflect all edits occurring since the last release.

A user may at any subsequent time change the mode of the incorporated content via various user interface techniques, such as by right-clicking on the incorporated content and selecting an item from a resulting context menu, selecting incorporated content and choosing a menu-bar menu item, interacting with a specialized control that is displayed when the mouse cursor hovers over the incorporated content, etc. In some embodiments, the facility incorporates or interoperates with a system of authority and access controls and other content governance measures limit the actions that can be taken by a particular user with respect to a particular document or fragment in various circumstances, including changing the mode of an existing fragment reference.

In some embodiments, when retrieving the time-specified fragment version for content incorporated in pinned mode, the facility notifies the user if a version of the origin fragment that is more recent than the read-only fragment to enable the user to switch the mode to live, or remain in pinned mode but replace the time specified for the version in the reference with the time corresponding to the latest version.

In some embodiments, the facility maintains metrics on the incorporation of fragments into documents to be able to report on various "hot fragments" measures, which identify fragments that are incorporated into the most total documents, or fragments that have been incorporated into the most documents during a recent period of time, across an organization or another group of users, among a group or category of documents, etc.

By behaving in some or all of the ways described above, the facility unencumbers the development of presentation resources, and enables authors of content to exert control over how that content is presented.

Hardware

FIG. 1 is a network diagram showing the environment in which the facility operates in some embodiments. The network diagram shows clients 110 each being used by a different user. Each of the clients executes software enabling its user to create, revise, and present electronic documents. Software on the client also enables the client to retrieve and synthesize remotely-stored document contents, including document fragments. In particular, the Internet 120 or one or more other networks connect each of the clients to a number of different data centers, e.g., data centers 131, 141, and 151, which in some embodiments are distributed geographically to provide disaster and outage survivability, both in terms of data integrity and in terms of continuous availability. Distributing the data centers geographically also helps to minimize communications latency with clients in various geographic locations. Each of the data centers contain servers, e.g. servers 132, 142, and 152. The servers access storage devices containing document contents, including document fragments, and execute software for responding to requests from clients and other servers to store and retrieve document contents, again including document fragments. In various embodiments, the facility uses various different distributions of responsibility for retrieving and combining document fragments between the clients and the servers.

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other different devices may be used as clients, including desktop computer systems, laptop computer systems, automobile computer systems, tablet computer systems, smart phones, personal digital assistants, televisions, cameras, etc.

Figure 2:
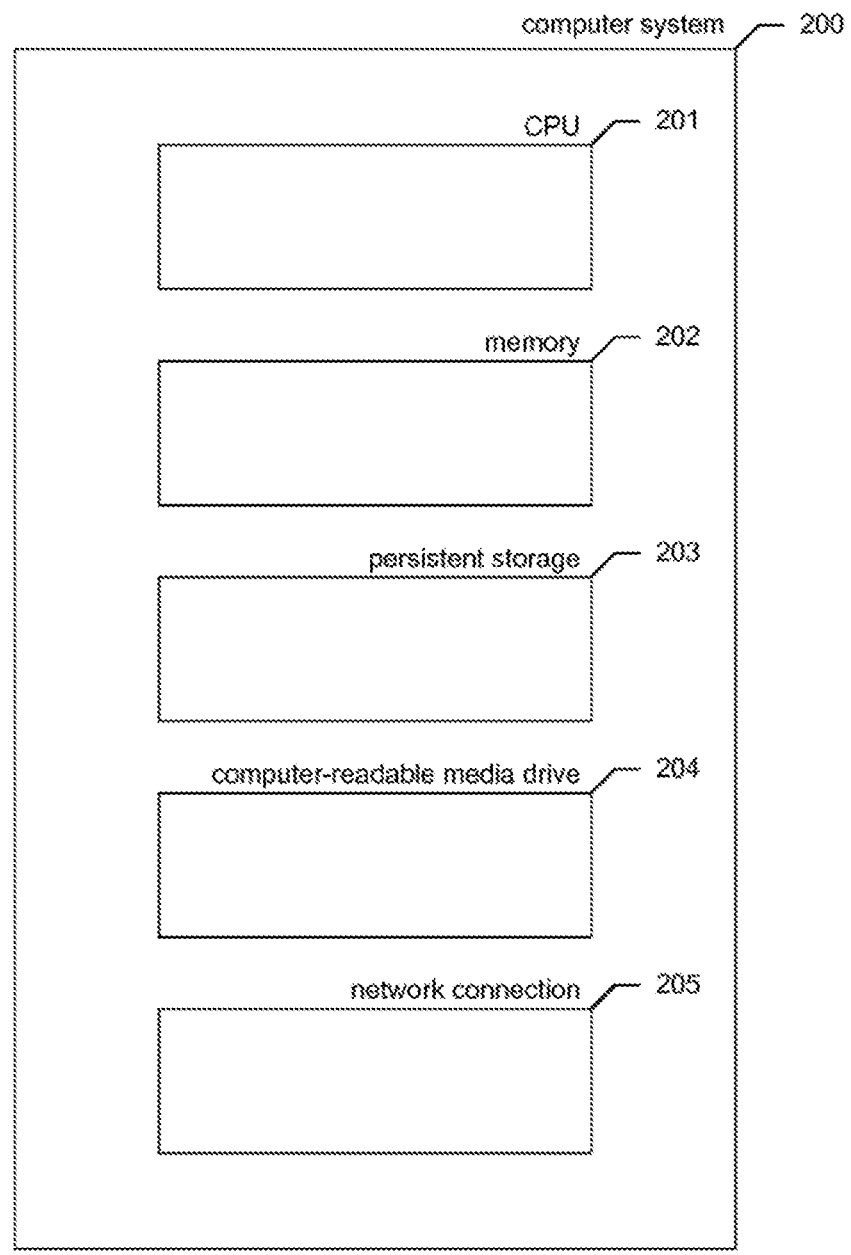
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various embodiments, these computer systems and other devices 200 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 201 for executing computer programs; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Fragment Management

A user can incorporate pre-existing content into a target document by, for example, selecting that content within the source document, then performing interactions for transferring the selected content to a particular position in the target document. In various embodiments, such interactions can be, for example, placing the selected content on the clipboard, then pasting it into the target document at the target position; dragging the selected content from the source document to the target position in the target document; etc.

Figure 5:
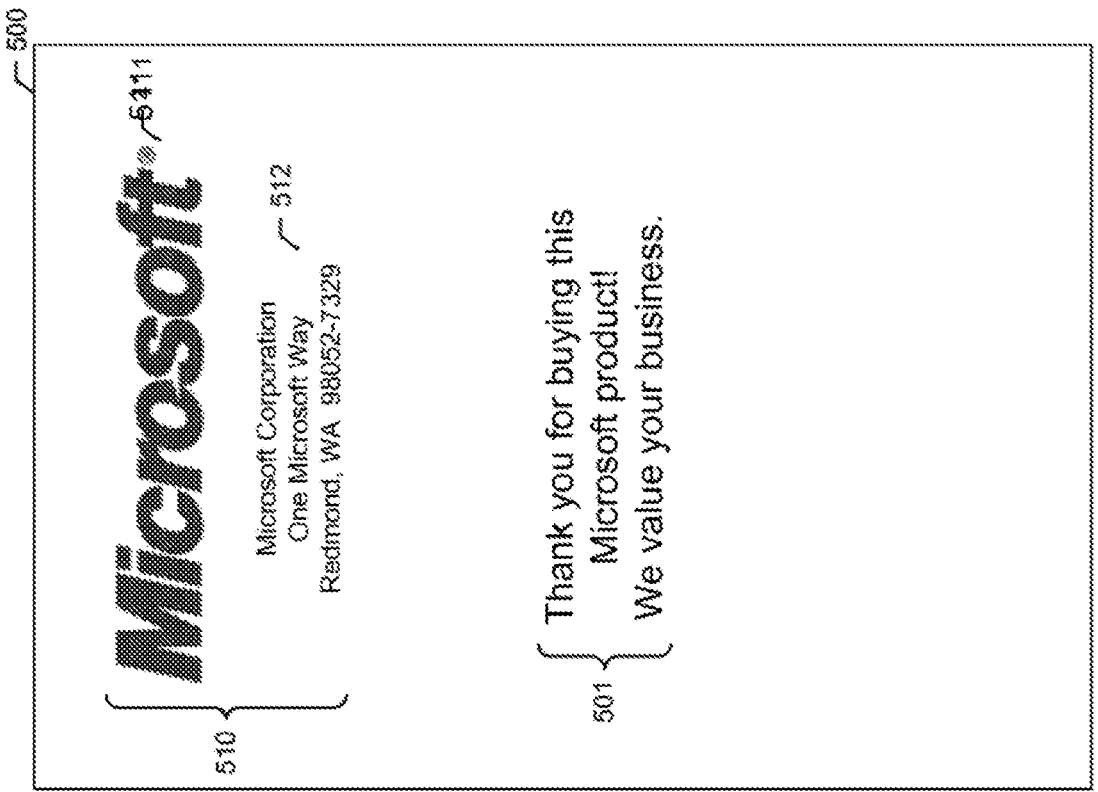
Figure 4:
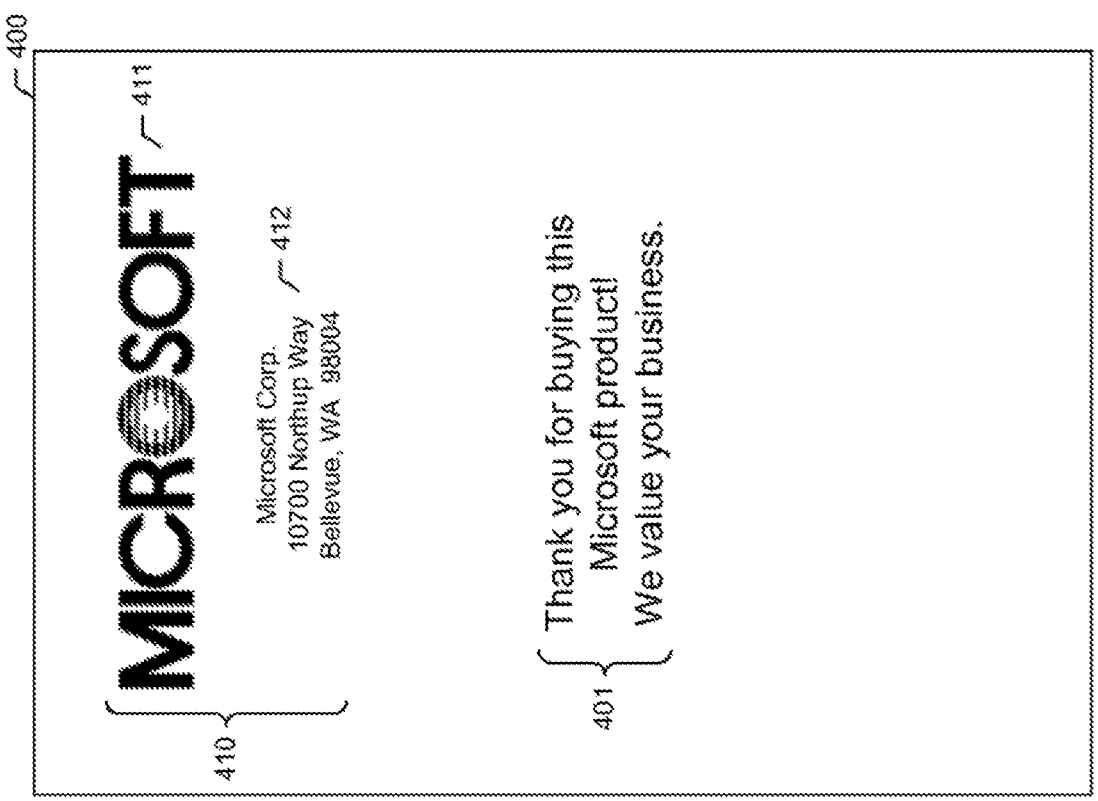

FIGS. 3-5 are display diagrams showing the editing and display of a document incorporating a shared document fragment. FIG. 3 is a display diagram showing a sample target document at a time before the shared document fragment is incorporated. The target document 300 includes text 301. This text may be directly contained by the root fragment for the target document, or may be contained by a fragment identified by a fragment reference within the root fragment for the target document.

FIG. 4 is a display diagram showing the sample target document at a time immediately after the shared document fragment is incorporated. At this time, the target document 400, in addition to containing text 401, contains incorporated content 410 transferred from a source document (not shown). The incorporated content constitutes a company's letterhead, including both an image 411 of the company's logo and the company's textual address 412.

Where the user incorporates the letterhead content in pinned mode, the letterhead content will remain unchanged in the target document unless and until the incorporation is changed to a different mode. Where the user incorporates the letterhead content in forked mode, the user can change the letterhead content in the context of the target document; such changes will not affect the letterhead content in the source document, and any changes to letterhead content in the source document will not be reflected in the target document. Where the user incorporates the letterhead content in live mode, the user can, subject to any applicable permissions, change the letterhead content in the context of the target document, and doing so will change the letterhead content in the source document and any other document that incorporates the letterhead content in live mode. Similarly, changes to the letterhead content via the source document or any other document that incorporates the letterhead content in live mode will be reflected in the target document.

FIG. 5 is a display diagram showing the sample target document where, after the shared document fragment is incorporated into the target document in live mode, the content is changed in the context of the source document, such as by another user. It can be seen that, in the target document 500 at this time, the letterhead content 510 contains a new company logo 511 and a new company address 512, both substituted in the context of the source document, and reflected in the target document pursuant to the target document's incorporation of this content in live mode.

Figure 6:
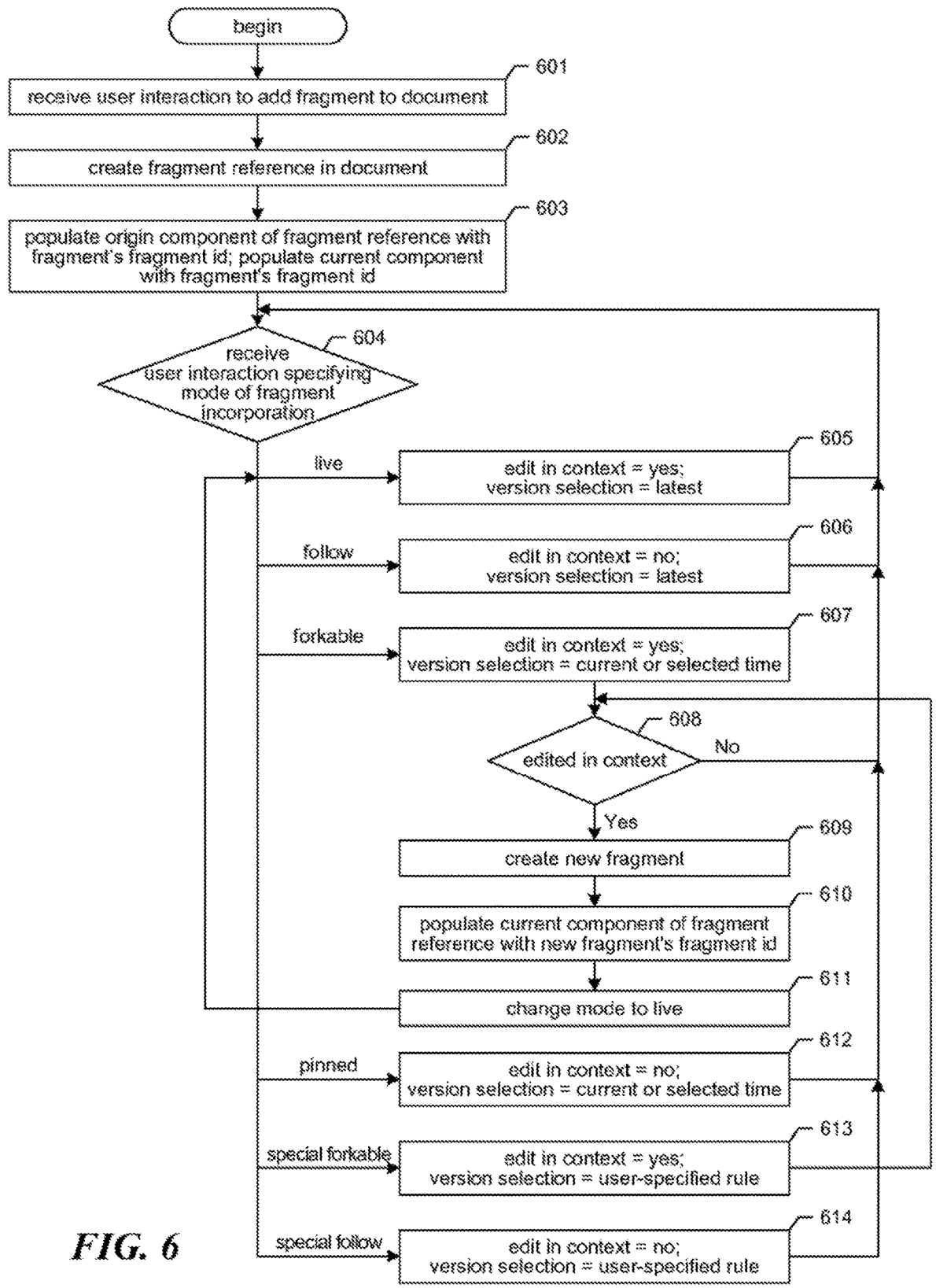
FIG. 6 is a flow diagram showing steps typically performed by the facility in some embodiments in order to incorporate a document fragment into a document, and adjust the mode of its incorporation.

FIG. 6 is a flow diagram showing steps typically performed by the facility in some embodiments in order to incorporate a document fragment into a document, and adjust the mode of its incorporation. In step 601, the facility receives a user interaction to add a fragment to a target document. In various embodiments, such interactions can be, for example, copying the selected content onto the clipboard, then pasting it into the target document at the target position; dragging the selected content from the source document to the target position in the target document; etc. Where the user selects content to add to the target document that don't exactly correspond to whole existing fragments, the facility creates one or more fragments to which the selected content does exactly correspond, such as by subdividing fragments that occur in the source document. In some cases, this involves altering and/or adding fragment references in the source document, and in one or more other documents incorporating the same content in live mode.

In step 602, the facility creates a fragment reference in the target document. In step 603, the facility populates both the origin component of the fragment reference and its current component with the fragment ID of the fragment added to the document. In step 604, the facility receives a user interaction specifying a mode for incorporating the fragment in the target document. In some embodiments, a single interaction or a related sequence of interactions can both add the fragment to the document and specify a mode. If the user action received in step 604 specifies the live mode, then the facility continues in step 605; if it specifies the follow mode, then the facility continues in step 606; if it specifies the forkable mode, then the facility continues in step 607; if it specifies the pinned mode, then the facility continues in step 612; if it specifies the special forkable mode, then the facility continues in step 613; and if it specifies the special follow mode, then the facility continues in step 614.

In step 605, where the live mode is specified, the facility sets edit in context to yes for the reference, and sets version selection to latest. After step 605, the facility continues in step 604 to permit the user to, at a later time, specify a new mode for this fragment. In step 606, where the follow mode is specified, the facility sets edit in context to no for the reference, and sets version selection to latest. After step 606, the facility continues in step 604. In step 607, where the forkable mode is specified, the facility sets edit in context to yes for the reference, and sets version selection to the current time, or an earlier time selected by the user. In step 608, if the user chooses to edit the fragment in the context of the reference, then the facility continues in step 609, else the facility continues in step 604. In step 609, the faculty creates a new fragment that reflects application of the edit of step 608 to the added fragment. The new fragment has a different fragment ID than the added fragment. In step 610, the facility populates the current component of the fragment reference with the new fragment's fragment ID. In step 611, the facility changes the reference's mode to live. After step 611, the facility continues in step 605. In step 612, where the pinned mode is specified, the facility sets edit in context to no for the reference, and sets version selection to the current time, or to an earlier time selected by the user. After step 612, the facility continues in step 604. In step 613, where the special forkable mode is specified, the facility sets edit in context to yes, and sets version selection to a version selection rule, such as a version selection rule specified via additional user interactions, a default version selection rule, an inferred version selection rule, etc. After step 613, the facility continues in step 608. In step 614, where the special follow mode is specified, the facility sets edit in context to no, and sets version selection to a version selection rule in a manner similar to step 613. After step 614, the facility continues in step 604.

Those skilled in the art will appreciate that the steps shown in FIG. 6 and in each of the flow diagrams discussed below may be altered in a variety of ways. For example, the order of the steps may be rearranged; some steps may be performed in parallel; shown steps may be omitted, or other steps may be included; a shown step may be divided into sub steps, or multiple shown steps may be combined into a single step, etc.

Figure 7:
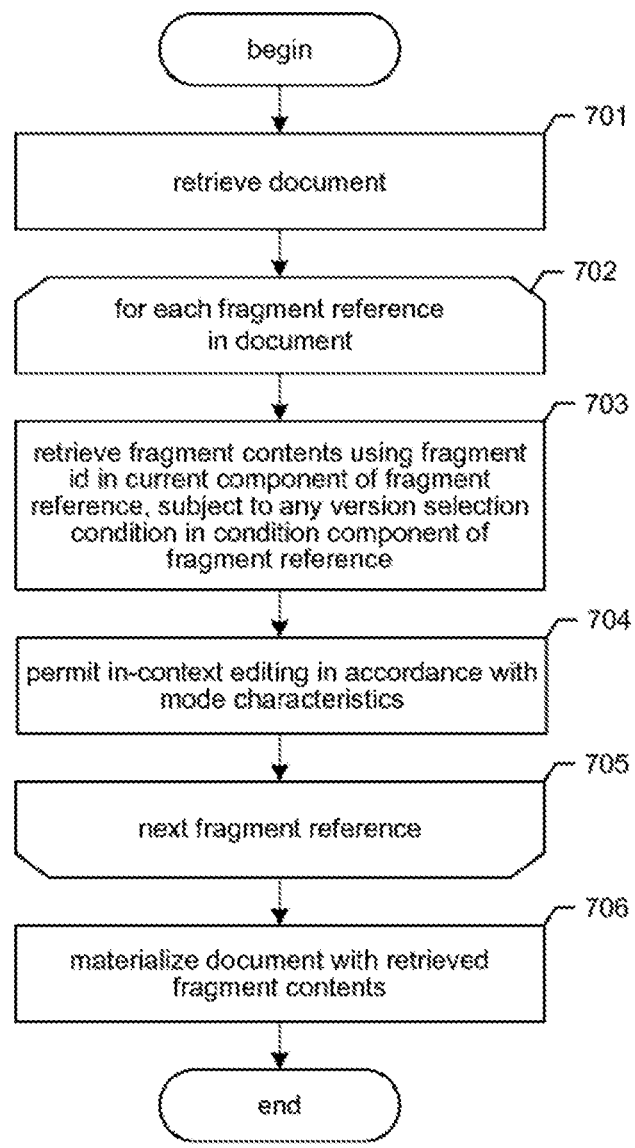
FIG. 7 is a flow diagram showing steps typically performed by the facility in some embodiments in order to materialize a document containing shared fragments.

FIG. 7 is a flow diagram showing steps typically performed by the facility in some embodiments in order to materialize a document containing shared fragments. In various embodiments, the facility performs these steps when a document is opened, when a document needs to be displayed, when a user attempts to add it to document, etc. In various embodiments, the facility's performance of these steps is distributed between the client and servers in various ways. In step 701, the facility retrieves a document, such as by retrieving its root fragment. The facility loops through steps 702-704 for each fragment reference occurring in the document, including transitive fragment references from one fragment to another. In step 703, the facility retrieves content of the fragment using the fragment ID contained in the current component of the fragment reference. This retrieval is subject to any version selection condition contained in the condition component of the fragment reference; that is, the retrieval is performed with respect to the latest version of the fragment that specifies any contained version selection condition, or, absent a version selection condition, the latest version of the fragment. In various embodiments, the facility uses various forms of fragment version selection logic. In some embodiments, the process of retrieving a fragment indicates permissions associated with the fragment, including whether the fragment can be edited by the current user, which the facility uses to indicate and control whether the user can edit the fragment in the context of the document. Fragment retrieval is discussed in greater detail below in connection with FIGS. 8-11. In step 704, the facility makes the fragment editable in context based on the mode of the fragment reference. In step 705, if additional fragment references remain to be processed, then the facility continues in step 702 to process the next fragment reference, else the facility continues in step 706. In step 706, the facility materializes the document using the fragment contents retrieved in step 703. After step 706, these steps conclude. In some embodiments (not shown), rather than performing the processing shown in FIG. 7 in a loop, the facility performs it as a recursive descent of a tree-like graph with lenses acting as parents of content nodes, and modifying rendering behavior as the document is materialized.

FIG. 8 is a table diagram showing sample contents of a fragment directory table used by the facility in some embodiments to store information about fragments. In some embodiments, the fragment directory table, and the other tables described in FIGS. 9-11, are stored in a data center on a storage device accessible to servers executing server software that is part of the facility. In some embodiments, some or all of these tables are stored in multiple data centers in order to provide survivability and a measure of locality for the data they store. The fragment directory table 800 is made up of rows such as rows 801-802 each corresponding to a different fragment. Each row is divided into the following columns: a fragment ID column 811 containing a fragment ID identifying the fragment to which the row corresponds; a created by column 812 containing information identifying a user that created the fragment; a creation time column 813 having contents indicating the time at which the fragment was created; and an access permissions column 814 specifying the ways in which the fragment can be accessed by various users. For example, row 801 indicates that a fragment having fragment ID 894645 was created by user visin at 9/6/2002 14:19:01, and can be read and written by all users. In some embodiments, the facility employs geographically-invariant times, such as times expressed in Greenwich Mean Time, in order to coordinate servers and clients located in different time zones. Where the server receives a retrieval request for fragment ID 894645, it uses row 801 to determine access permissions for this fragment.

While FIG. 8 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed, encrypted, and/or indexed; may contain a much larger number of rows than shown, etc.

FIG. 9 is a table diagram showing sample contents of a fragment version table used by the facility in some embodiments to store information about fragment versions. In particular, the facility uses the fragment version table to identify the different versions of a fragment that exist, and their time order. In some embodiments, the facility maintains only a single version of each fragment, in which case the fragment version table is not necessary, and fragment IDs are substituted for fragment version IDs in other tables maintained by the facility. The fragment version table 900 is made up of rows such as rows 901-903 each corresponding to a different fragment version. Each of the rows is divided into the following columns: a fragment version ID column 911 containing a fragment version ID for the fragment version to which the row corresponds that uniquely identifies this fragment version; a fragment ID column 912 containing the fragment ID identifying the fragment to which this fragment version corresponds; and an update time column indicating the time at which the fragment version was last updated. For example, row 901 indicates that the fragment version having fragment version ID 65489151 corresponds to the fragment having fragment ID 894645, and was last updated at 9/15/2002 9:17:12. Where the server receives a retrieval request for fragment ID 894645, it uses rows 901 and 902 to identify the two fragment versions that exist for this fragment ID. These two rows can also be used to determine which of the fragment versions is more recent.

In some embodiments, where fragment versions are used, some fragment versions are writeable, such that an author can change the content at a time after it is created, at least in the case of fragment versions that are not referenced by any pinned fragment references. However, in some embodiments, every fragment version is read-only, and any revision of content contained by an existing fragment version causes the facility to create a new fragment version. In various embodiments, the creation of a new fragment version occurs at various levels of granularity, including a new fragment version for each editing session, a new fragment version for each keystroke, or at some level in between, such as every five seconds, every minute, every 15 minutes, etc.

FIG. 10 is a table diagram showing sample contents of a fragment version instance table used by the facility in some embodiments to store information about fragment version instances. In particular, the facility uses the fragment version instance directory table to identify, for particular fragment version, instances of the fragment version that are stored on different servers, so that the facility can choose one of the fragment versions for retrieval, and so that, if a fragment version is being changed in an embodiment where this is possible, every instance of it can be changed or invalidated. The fragment version instance directory table 1000 is made up of rows such as rows 1001-1008 each corresponding to a different combination of a fragment version and a server on which an instance of the fragment version is stored. Each row is divided into the following columns: a fragment version ID column 1011 containing if fragment version ID identifying the fragment version; and a server ID column 1012 identifying a server on which an instance of the fragment version is stored. For example, row 1001 indicates that the fragment version having fragment version ID 12345498 has an instance stored on the server having server ID 9103. In various embodiments, the facility uses various other approaches to identifying locations in which instances of fragment versions are stored, such as by using data center IDs, storage device IDs, etc.

FIG. 11 is a table diagram showing sample contents of a fragment version instance content table used by the facility in some embodiments to store fragment version instance content. The fragment version instance content table 1100 is made up of rows such as rows 1101-1103 each corresponding to fragment version instances all stored on a particular server. The fragment version instance content table 1100 is, in particular, stored on the server having server ID 9103. Each of the rows is divided into the following columns: a fragment version ID column 1111 containing the fragment version ID identifying the fragment version to which the row corresponds; an update time column 1112 indicating the time at which the fragment version instance was last updated; and a fragment contents column 1113 containing the contents of the fragment version instance. For example, row 1101 indicates that the fragment version instance having fragment version ID 91285817 and update time 1/16/1987 16:02:54 contains particular image data. It is the fragment 1113 that contains the data that the facility returns in response to a fragment retrieval request.

In some embodiments, rather than storing each fragment version instance as a single entity as shown in FIG. 11, the facility employs an "erasure coding" technique in which it distributes the contents of each fragment version instance as any number of smaller shreds, which can be stored on any arrangement of servers.

Decoupled Presentation Resources

Figure 12:
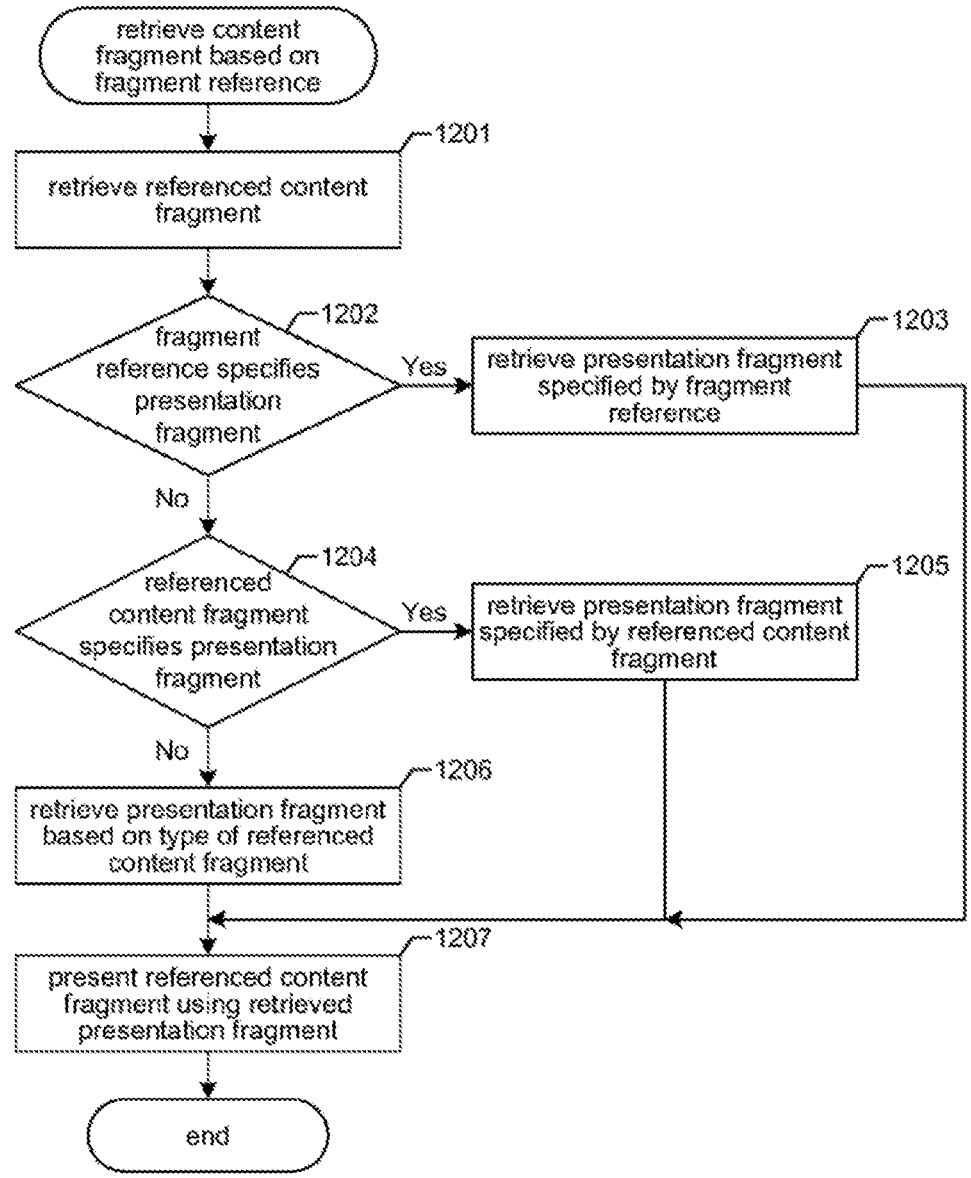
FIG. 12 is a flow diagram showing steps typically performed by the facility in order to retrieve a content fragment, including selecting a presentation fragment for the content fragment and using the selected presentation fragment to present the content fragment.

FIG. 12 is a flow diagram showing steps typically performed by the facility in order to retrieve a content fragment, including selecting a presentation fragment for the content fragment and using the selected presentation fragment to present the content fragment. In some embodiments, the content fragment that is retrieved is a content fragment referenced by a fragment reference in another content fragment. In step 1201, the facility retrieves the content fragment referenced by the fragment reference. In some embodiments, this involves selecting and retrieving a particular version of the content fragment as discussed above, in some cases sensitive to the mode of the fragment reference. In step 1202, if the fragment reference specifies a presentation fragment for use in presenting the referenced content fragment, then the facility continues to step 1203, else the facility continues in step 1204. In step 1203, the facility retrieves the presentation fragment specified by the fragment reference. In some embodiments, the facility in step 1203 (and in steps 1205 and 1206 discussed below) employs presentation fragment version selection logic described further below to select a particular version of the specified presentation fragment for retrieval. In some embodiments, in addition to specifying a presentation fragment, the fragment reference also specifies a basis for selecting a version of the presentation fragment, such as selecting the latest presentation fragment, or selecting the latest presentation fragment after a certain specified time. After step 1203, the facility continues in step 1207. In step 1204, if the referenced content fragment retrieved in step 1201 specifies a presentation fragment, then the facility continues in step 1205, else the facility continues in step 1206. In step 1205, the facility retrieves the presentation fragment specified by the referenced content fragment. After step 1205, the facility continues in step 1207. In step 1206, the facility retrieves a presentation fragment based upon the type of the referenced content fragment. For example, in some embodiments, the facility retrieves one presentation fragment for text content fragments, and another presentation fragment for numeric table content fragments. In step 1207, the facility presents the referenced content fragment retrieved in step 1201 using the presentation fragment retrieved in step 1203, 1205, or 1206. After step 1207, these steps conclude.

FIG. 13 is a table diagram showing sample contents of a content fragment type mapping table used by the facility in some embodiments to select a presentation fragment for a content fragment on the basis of the content fragment's type. The table 1300 is made up of rows, such as rows 1301-1303, each corresponding to a different presentation fragment. In some embodiments, all presentation fragments available for use are listed in the content fragment type mapping table; in some embodiments, only a proper subset of the available presentation fragments are listed. In particular, each row specifies, for the presentation fragment to which it corresponds, the type of content fragments it is to be used to present in column 1311. For example, row 1301 indicates in column 1312 that the presentation fragment having fragment ID 569349 is intended to present text content fragments. Row 1301 further indicates in column 1313 that this presentation fragment is to be used as the default presentation fragment for content fragments of this type, i.e., that this presentation fragment is to be used for text content fragments for which a presentation fragment is not listed, either in the content fragment itself or in the fragment reference being used to incorporate the content fragment. In various embodiments, the facility uses various other schemes to select an appropriate presentation fragment from among the presentation fragments listed for a content fragment's type.

In some embodiments, the facility uses the contents of the content fragment type mapping table or a similar table as a basis for displaying to an author who is in the process of specifying a presentation fragment for a content fragment or a fragment reference referencing the content fragment the presentation fragments that are available for content fragments of that content fragment's type. For example, where an author is inserting a fragment reference to a text content fragment, the facility may present information—such as a textual description—about each of the presentation fragments having fragment IDs 569349 and 443870.

Figure 14:
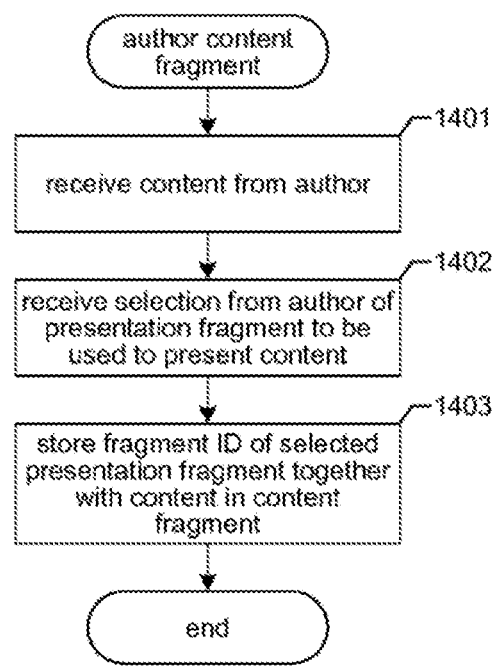
FIG. 14 is a flow diagram showing steps typically performed by the facility in some embodiments to author a content fragment based on input from an author.

FIG. 14 is a flow diagram showing steps typically performed by the facility in some embodiments to author a content fragment based on input from an author. In step 1401, the facility receives content from the author. In step 1402, the facility receives selection from the author of a presentation fragment to be used to present the content, at least where not overridden by a different presentation fragment specified by a fragment reference incorporating this content fragment. In step 1403, the facility stores the fragment ID of the presentation fragment selected in step 1402 together with the content received in step 1401 in the content fragment. After step 1403, these steps conclude.

Figure 15:
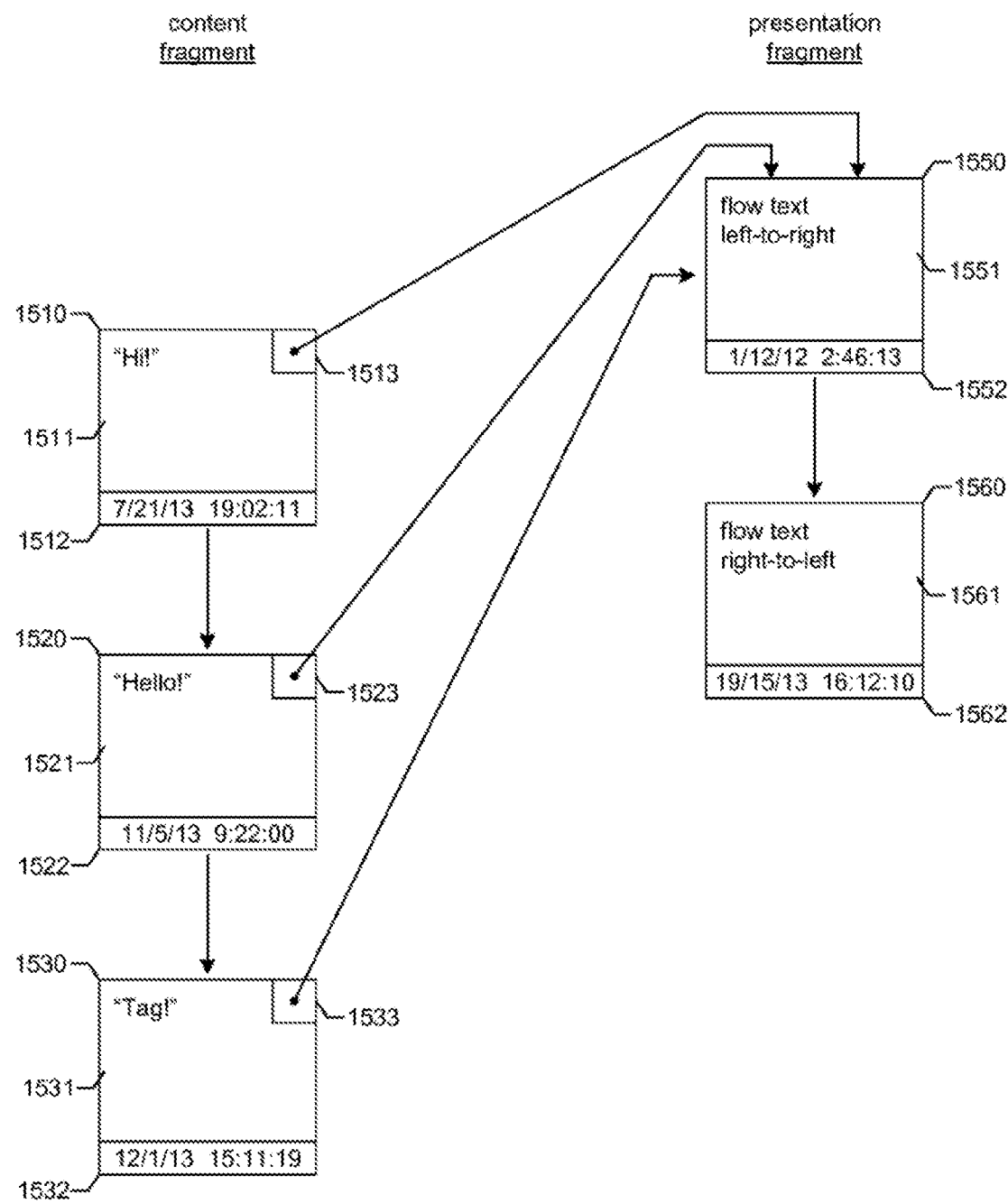
FIG. 15 is a data structure diagram showing relationships between versions of a content fragment and versions of a presentation fragment to which they refer.

FIG. 15 is a data structure diagram showing relationships between versions of a content fragment and versions of a presentation fragment to which they refer. A content fragment has three versions 1510, 1520, and 1530. Each of the shown versions of the content fragment has content, a time stamp, and a reference to a presentation fragment. For example, content fragment version 1510 has textual content 1511, time stamp 1512, and reference 1513 to a presentation fragment. The presentation fragment referred to by content fragment version 1510 has two shown versions, presentation fragment versions 1550 and 1560. Each of these presentation fragment versions has presentation code and a time stamp. For example, presentation fragment version 1550 has presentation code 1551 and time stamp 1552. For ease of understanding, in place of the actual presentation code 1551, a narrative summary describing effect of that code is shown: the code flows the text in a text content fragment in a left-to-right order. Version 1560 of the same presentation fragment flows text in the opposite direction, and has a later time stamp. Because references 1513 and 1523 are shown pointing downward at presentation fragment version 1550, these references specify using the latest version of this presentation fragment; because reference 1533 points at the left side of presentation fragment version 1550, this reference specifies using this particular version of the presentation fragment, even if later versions are available. Thus, references 1513 and 1523 are similar to live references to content fragments, while reference 1533 is similar to a pinned reference to a content fragment.

The specification of presentation fragments shown in FIG. 15 is capable of producing different presentation outcomes at different times. In various embodiments, this occurs when a live materialization request is received at a particular time, or when a materialization request for the content fragment specifies a particular effective time, or where the content fragment is being displayed in a timeline viewer that a user can use to display the content fragment at a variety of effective times.

Figure 16:
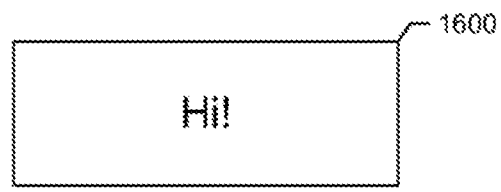
FIG. 16 is a display diagram showing the presentation results of presenting the content fragments shown in FIG. 15 at a first effective time.

FIG. 16 is a display diagram showing the presentation results of presenting the content fragments shown in FIG. 15 at an effective time between 7/21/13 19:02:11 and 9/15/13 16:12:10. The display 1600 contains content 1511 from content fragment version 1510, displayed left-to-right by a presentation code 1551 in presentation fragment version 1550.

Figure 17:
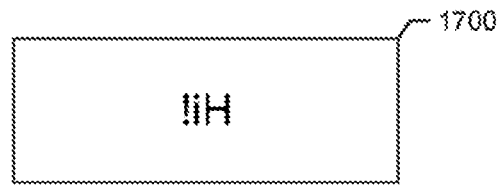
FIG. 17 is a display diagram showing sample presentation results of the content fragment shown in FIG. 15 at a second effective time.

FIG. 17 is a display diagram showing sample presentation results of the content fragment shown in FIG. 15 between times 9/15/13 16:12:10 and 11/5/13 9:22:00. It can be seen that display 1700 contains content 1511 from content fragment version 1510 displayed right-to-left by presentation code 1561 in presentation fragment version 1560.

Figure 18:
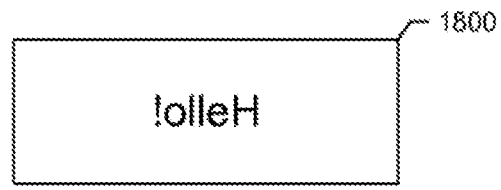
FIG. 18 is a display diagram showing sample presentation results for the content fragment shown in FIG. 15 at a third effective time.

FIG. 18 is a display diagram showing sample presentation results for the content fragment shown in FIG. 15 between times 11/5/13 9:22:00 and 12/1/13 15:11:19. It can be seen that the display 1800 contains content 1521 from content fragment version 1520, displayed right-to-left by presentation code 1561 in presentation fragment version 1560.

Figure 19:
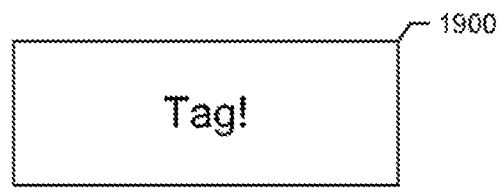
FIG. 19 is a display diagram showing sample presentation results for the content fragment shown in FIG. 15 at a fourth effective time.

FIG. 19 is a display diagram showing sample presentation results for the content fragment shown in FIG. 15 after time 12/1/13 15:11:19. It can be seen that display 1900 contains content 1531 contained by content fragment version 1530, displayed left-to-right by presentation code 1551 in presentation fragment version 1550.

In some embodiments, a presentation fragment can reference another presentation fragment to incorporate in the referencing presentation fragment the code in the referenced presentation fragment. Also, in some embodiments, the code of a presentation fragment can contain logic for selecting between two or more other presentation fragments or presentation fragment versions that it references.

Figure 20:
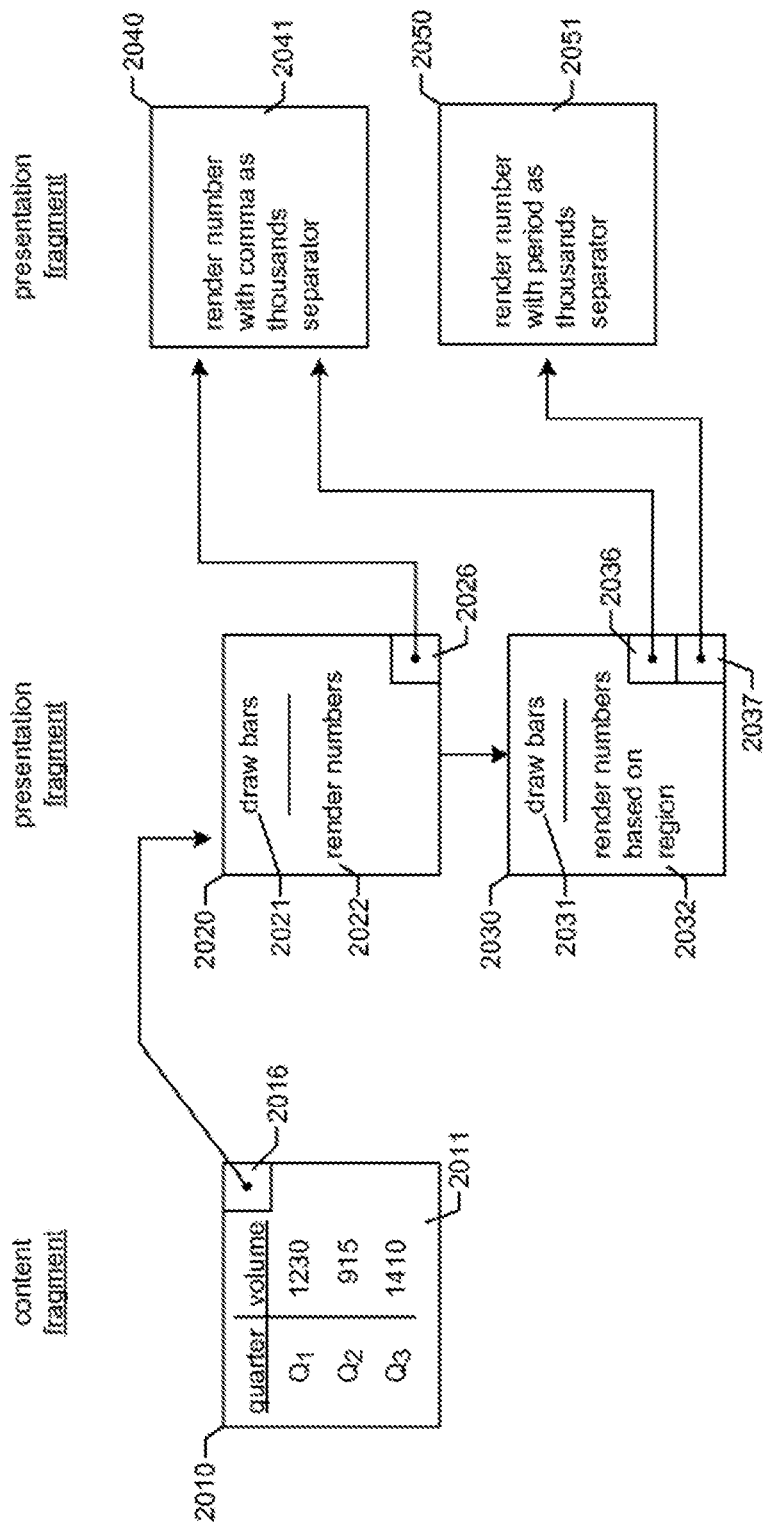
FIG. 20 is a data structure diagram showing presentation fragment versions that reference other presentation fragment versions.

FIG. 20 is a data structure diagram showing presentation fragment versions that reference other presentation fragment versions. A version 2010 of a content fragment contains table content 2011, and a reference 2016 to a first presentation fragment. The first presentation fragment has two versions, presentation fragment versions 2020 and 2030. Presentation fragment version 2020 contains presentation code 2021 for drawing bars of a graph based upon numerical values in a table, as well as presentation code 2022 for rendering those numbers as labels to the bars of the graph. Presentation code 2022 includes a reference 2026 to version 2040 of a second presentation fragment. Presentation fragment version 2040 contains presentation code 2041 for rendering a number using the comma character as a separator between the thousands digit and the hundreds digit.

Figure 21:
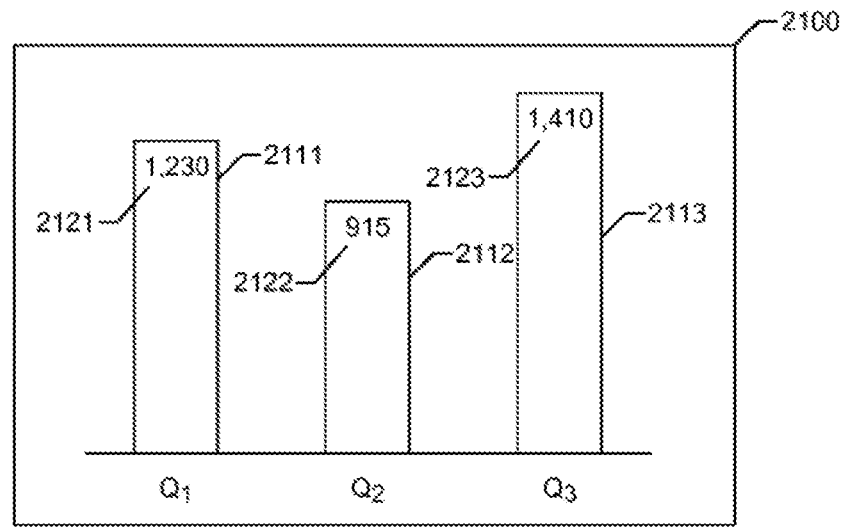
FIG. 21 is a display diagram showing presentation results for the content fragment shown in FIG. 20 at a first time.

FIG. 21 is a display diagram showing presentation results for the content fragment shown in FIG. 20 at a time before presentation fragment version 2030 has been created. At this point, presentation fragment version 2020 is used. Its presentation code 2021 draws bars 2111, 2112, and 2113 at the correct heights in display 2100. Its presentation code 2022 renders numbers 2121, 2122, and 2123 by executing presentation code 2041 in presentation fragment version 2040. Executing presentation code 2041 causes numbers 2121 and 2123 to have a comma separator between the thousands and hundreds digit.

Figure 22:
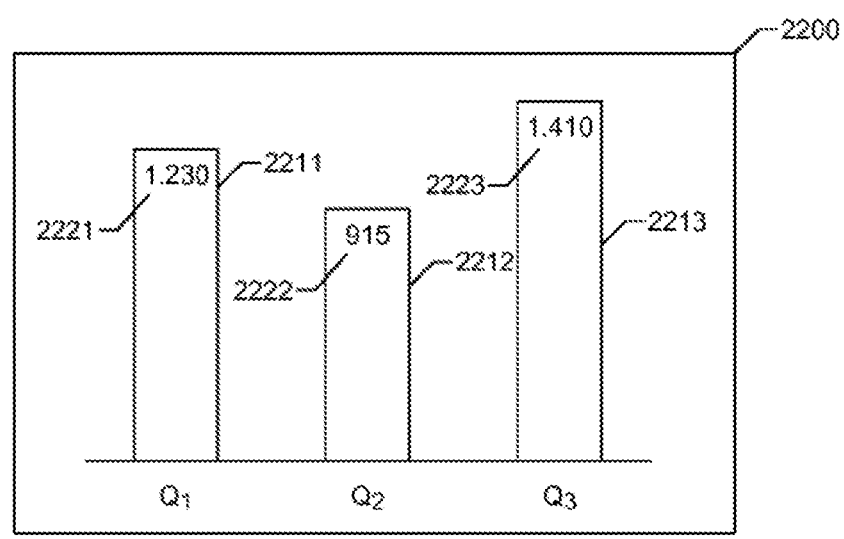
FIG. 22 is a display diagram showing presentation results generated in a European geographic region for the content fragment shown in FIG. 20 at a second time.

FIG. 22 is a display diagram showing presentation results generated in an Eastern European geographic region for the content fragment shown in FIG. 20 after presentation fragment version 2030 is created. Because reference 2016 in content fragment version 2010 points at the top of presentation fragment version 2020, it specifies the latest version of the corresponding presentation fragment, which now is presentation fragment version 2030. Its presentation code 2031 draws bars 2211, 2212, and 2213 at the proper heights in display 2200. Further, its presentation code 2032 renders numbers 2221, 2222, and 2223 differentially based upon region. Here, where the region is Eastern Europe, the presentation code 2032 follows reference 2037 to presentation fragment version 2050, whose presentation code 2051 renders numbers 2221 and 2223 with a period as the thousands separator. On the other hand, where the content fragment shown in FIG. 20 is presented after presentation fragment version 2030 is created in the U.S. region, presentation code 2032 follows reference 2036 to presentation fragment version 2040, whose presentation code 2041 uses the comma thousands separator as shown in FIG. 21.

Figure 23:
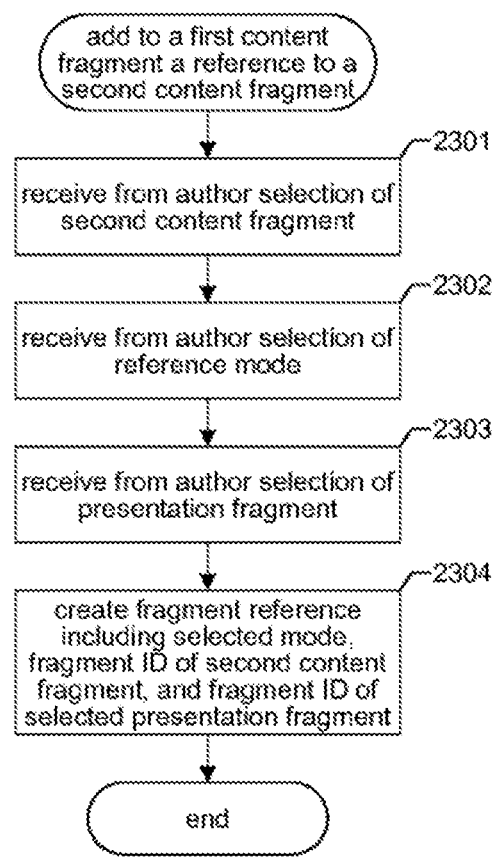
FIG. 23 is a flow diagram showing steps typically performed by the facility in some embodiments in order to add to a first content fragment a reference to a second content fragment.

FIG. 23 is a flow diagram showing steps typically performed by the facility in some embodiments in order to add to a first content fragment a reference to a second content fragment. In step 2301, the facility receives from an author selection of the second content fragment in the context of the first content fragment. In step 2302, the facility receives from the author selection of a reference mode for the fragment reference being added to the first content fragment. In step 2303, the facility received from the author selection of a presentation fragment to be used to present the second content fragment in the context of the first content fragment. In step 2304, the facility creates a fragment reference including the reference mode selected in step 2302, the fragment ID of the second content fragment selected in step 2301, and the fragment ID of the selected presentation fragment selected in step 2303. After step 2304, these steps conclude.

Figure 24:
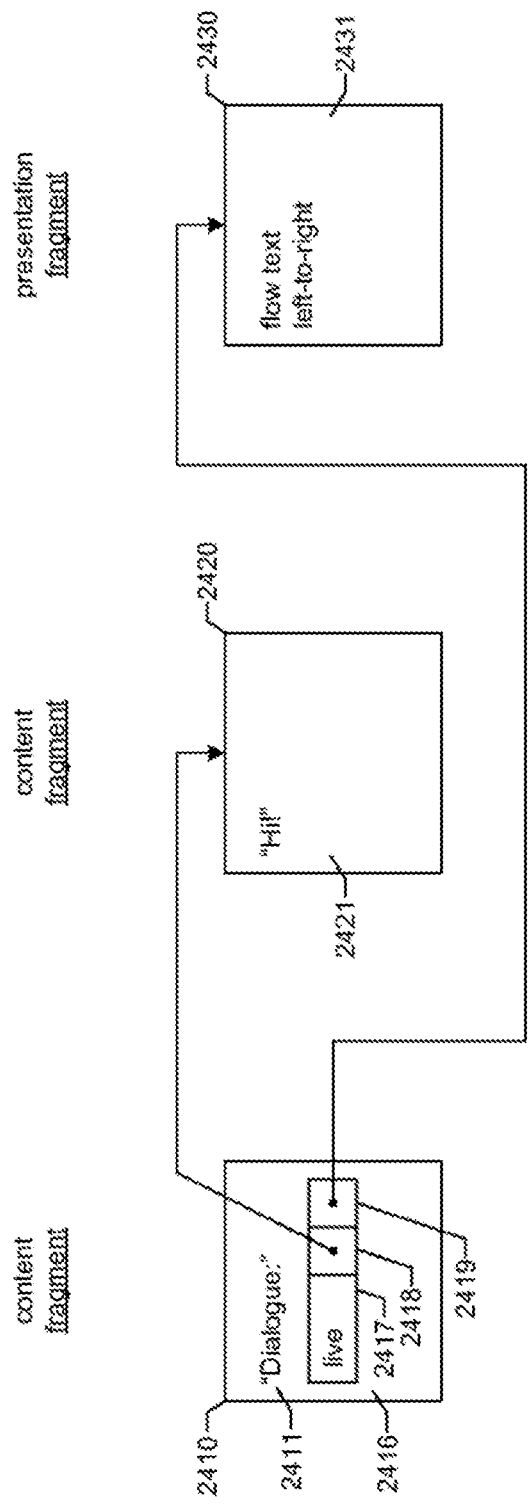
FIG. 24 is data structure diagram showing a fragment reference incorporating one content fragment into another content fragment that specifies a presentation fragment for presenting the referenced content fragment within the referencing content fragment.

FIG. 24 is data structure diagram showing a fragment reference incorporating one content fragment into another content fragment that specifies a presentation fragment for presenting the referenced content fragment within the referencing content fragment. The referencing content fragment 2410 includes native content 2411, as well as a fragment reference 2416. The fragment reference contains a live reference mode 2417, a pointer or fragment ID 2418 referencing the referenced content fragment 2420, and a reference or fragment ID 2419 referencing a selected presentation fragment 2430. Presentation code 2431 in the referenced presentation fragment 2430 is therefore used to present content 2421 in the referenced content fragment 2420 when the referencing content fragment 2410 is displayed. Thus specifying a presentation fragment as part of the fragment reference 2416, the author overrides any default presentation fragment selection based upon the type of referencing content fragment 2410. Also, if it were true that referenced content fragment 2420 itself specified a presentation fragment, the presentation fragment specified by the referenced content fragment 2420 would also be overridden by specification in content reference 2416 of presentation fragment 2430.

In some embodiments, rather than overriding a presentation fragment specified by a content fragment in favor of a different presentation fragment specified by a fragment reference to that content fragment as discussed above in connection with FIG. 24, the facility overrides a presentation fragment specified in a fragment reference to a content fragment in favor of a different presentation fragment specified inside that content fragment.

In some embodiments, the facility provides a computer system for presenting content fragments. The facility comprises: a request subsystem configured to receive requests each to present a content fragment, the requests received by the request subsystem each specifying a fragment identifier identifying the content fragment; a fragment retrieval subsystem configured to, for each request received by the request subsystem, retrieving from a fragment store contents of the content fragment identified by the fragment identifier specified by the request; an accessing subsystem configured to, for each request received by the request subsystem, access a fragment identifier associated with the content fragment identified by the fragment identifier specified by the request; the fragment retrieval subsystem being further configured to, for each request received by the request subsystem, retrieve from the fragment store contents of a presentation fragment identified by the fragment identifier accessed by the accessing subsystem for the request; and an invocation subsystem configured to, for each request received by the request subsystem, invoke code among the contents of the presentation fragment retrieved by the fragment retrieval subsystem for the request to present the contents of the content fragment retrieved by the identified by the fragment identifier specified by the request. Each of these subsystems is a computing-related entity, comprising either hardware, a combination of hardware and software, software, or software in execution on a computer.

In some embodiments, the facility provides computer-readable medium having contents configured to cause a computing system to, in order to present document contents: in an application: receive a request to materialize particular document content; in response to receiving the request: cause the document content to be retrieved; and cause presentation code neither native to the application nor linked into the application to be executed to present the retrieved document content.

In some embodiments, the facility provides a method in a computing system for presenting document contents. The method comprises: in an application: receive a request to materialize particular document content; in response to receiving the request: cause the document content to be retrieved; and cause presentation code neither native to the application nor linked into the application to be executed to present the retrieved document content.

In some amounts, the facility provides a computer-readable medium storing a fragment incorporation reference data structure associated with a document. The data structure comprises: a first fragment identifier identifying a content fragment that is to be incorporated into the document; and a second fragment identifier identifying a presentation fragment containing code to be executed to present contents of the content fragment in the context of the content fragment's incorporation into the document, such that the contents of the data structure are usable to retrieve the content fragment identified by the first fragment identifier, retrieve the presentation fragment identified by the second fragment identifier, and execute the code in the presentation fragment to present to the contents of the content fragment.

CONCLUSION

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:
1. A system for creating an electronic document including a document fragment, the system comprising:
   a processing unit configured to
      receive a first user interaction to add a fragment including content to the electronic document at a target position;
      receive a second user interaction to set a mode for incorporating the fragment into the electronic document at the target position; and
      create a fragment reference within the electronic document at the target position to represent the content included in the fragment, the fragment reference including an identifier, an edit value, and a version selection value, the edit value specifying whether the content included in the fragment is editable within the electronic document and the version selection value specifying how a version of the fragment is selected for incorporation in the electronic document, the edit value and the version selection value set based on the mode for incorporating the fragment into the electronic document at the target position, the content included in the fragment stored in an entry in a table separate from the electronic document, the entry including the identifier and the content.

2. The system of claim 1, wherein the processing unit is configured to receive the first user interaction to add the fragment via at least one selected from a group consisting of pasting of content into the electronic document at the target position and dragging content from a source document to the target position within the electronic document.

3. The system of claim 1, wherein the first user interaction and the second user interaction are received through a single interaction.

4. The system of claim 1, wherein the processing unit is further configured to receive a third user interaction to set access permissions for the fragment, wherein the access permissions are associated with the identifier and specify one or more ways one or more users can access the fragment.

5. The system of claim 4, wherein the one or more ways includes at least one selected from a group consisting of reading the fragment and writing the fragment.

6. The system of claim 1, wherein, in response to a receiving a file system command to open a file containing the electronic document within an application, the processing unit is configured to generate, at an operating system level, a temporary materialized view of the electronic document by retrieving the content included in the fragment from the table separate from the electronic document using the identifier included in the fragment reference included in the electronic document and providing the temporary materialized view of the electronic document to the application.

7. The system of claim 1, wherein the mode for incorporating the fragment into the electronic document includes at least one selected from a group consisting of a live mode, a follow mode, a forkable mode, and a pinned mode.

8. The system of claim 1, wherein, when the mode for incorporating the fragment into the electronic document is a live mode, the edit value is set make the content included in the fragment editable within the electronic document and the version selection value is set to a latest version of the fragment.

9. The system of claim 1, wherein, when the mode for incorporating the fragment into the electronic document is a follow mode, the edit value is set to make the content included in the fragment un-editable within the electronic document and the version value is set to a latest version of the fragment.

10. The system of claim 1, wherein, when the mode for incorporating the fragment into the electronic document is a forkable mode, the edit value is set to make the content included in the fragment editable within the electronic document and the version value is set to a time-specified version of the fragment.

11. The system of claim 1, wherein, when the mode for incorporating the fragment into the electronic document is a pinned mode, the edit value is set to make the content included in the fragment un-editable and the version value is set to a time-specified version of the fragment.

12. A method for creating an electronic document including a document fragment, the method comprising:
receiving, with a processing unit, a first user interaction to add a fragment including content to the electronic document at a target position;
receiving, with the processing unit, a second user interaction to set a mode for incorporating the fragment into the electronic document at the target position; and
creating, with the processing unit, a fragment reference within the electronic document at the target position to represent the content included in the fragment, the fragment reference including an identifier, and a version selection value, the version selection value specifying how a version of the fragment is selected for incorporation in the electronic document, the edit value and the version selection value set based on the mode for incorporating the fragment into the electronic document at the target position, the content included in the fragment stored in an entry in a table separate from the electronic document, the entry including the identifier and the content.

13. The method of claim 12, wherein the fragment reference further includes an edit value specifying whether the content included in the fragment is editable within the electronic document.

14. The method of claim 12, further comprising receiving a third user interaction to set access permissions for the fragment, wherein the access permissions are associated with the identifier and specify one or more ways one or more users can access the fragment.

15. The method of claim 14, wherein the one or more ways includes at least one selected from a group consisting of reading the fragment and writing the fragment.

16. The method of claim 12, further comprising, in response to a receiving a file system command to open a file containing the electronic document within an application, generating, at an operating system level, a temporary materialized view of the electronic document by retrieving the content included in the fragment from the table separate from the electronic document using the identifier included in the fragment reference included in the electronic document and providing the temporary materialized view of the electronic document to the application.

17. A storage device persistently storing executable instructions that, when executed by a processing unit, perform a set of functions, the set of functions comprising:
receiving a first user interaction to add a fragment including content to the electronic document at a target position;
receiving a second user interaction to set a mode for incorporating the fragment into the electronic document at the target position; and
creating a fragment reference within the electronic document at the target position to represent the content included in the fragment, the fragment reference including an identifier, and a version selection value, the version selection value specifying how a version of the fragment is selected for incorporation in the electronic document, the edit value and the version selection value set based on the mode for incorporating the fragment into the electronic document at the target position, the content included in the fragment stored in an entry in a table separate from the electronic document, the entry including the identifier and the content.

18. The storage device of claim 17, wherein the fragment reference further includes an edit value specifying whether the content included in the fragment is editable within the electronic document.

19. The storage device of claim 17, further comprising receiving a third user interaction to set access permissions for the fragment, wherein the access permissions are associated with the identifier and specify one or more ways one or more users can access the fragment.

20. The storage device of claim 17, further comprising, in response to a receiving a file system command to open a file containing the electronic document within an application, generating, at an operating system level, a temporary materialized view of the electronic document by retrieving the content included in the fragment from the table separate from the electronic document using the identifier included in the fragment reference included in the electronic document and providing the temporary materialized view of the electronic document to the application.

* * * * *